Aug. 23, 1949.  E. B. SCHIFFMANN  2,479,642

FISHING FLOAT

Filed March 1, 1948

Inventor.
Edward B. Schiffmann.
By Zabel and Gritzbaugh
Attorneys.

Patented Aug. 23, 1949

2,479,642

UNITED STATES PATENT OFFICE 2,479,642

FISHING FLOAT

Edward B. Schiffmann, Wilmette, Ill., assignor to
John F. Cottler, Oak Park, Ill.

Application March 1, 1948, Serial No. 12,440

1 Claim. (Cl. 43—51)

This invention relates to a fishing float, and more particularly to a device of the type popularly known as a "bobber."

One object of the invention is to provide a fishing float that may be cast or otherwise thrown a substantial distance by the fisherman. The device floats on the water and functions to lower a fish line containing hooks and bait at its end to a predetermined depth.

Another object is to provide a fishing float of this character using two lines, one extending from the fisherman to the float, and the other extending downwardly from the float to proper fishing depth. The float incorporates features that prevent commingling of the two lines and also insure proper operation of the device.

Other objects and advantages of the invention will become apparent as the description proceeds, reference being had to the accompanying drawing wherein one form of the invention is shown. It is to be understood that the description and drawing are illustrative only, and are not to be taken as limiting the invention except insofar as it is limited by the claim.

Figure 1:
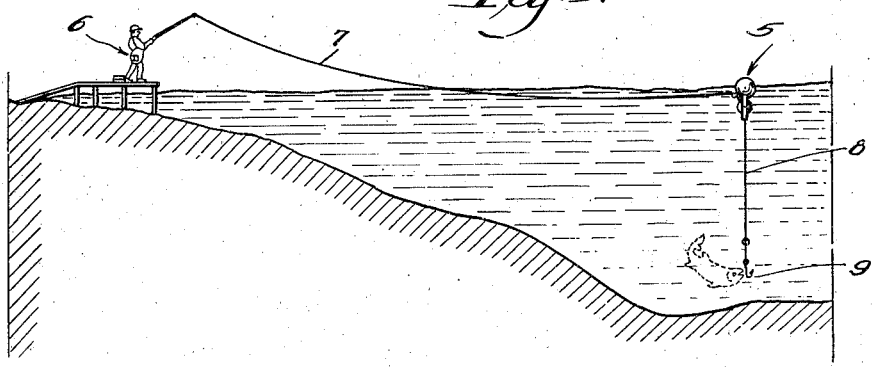
Fig. 1 is a sketch showing the general manner in which my fishing float is used.

Referring now to the drawing, the sketch of Fig. 1 shows my float 5 in fishing position some distance away from a fisherman 6. A line 7 extends from the fisherman to the float, and a line 8 extends downwardly from the float to a predetermined depth. Fish hooks, sinker and bait 9 are carried at the free end of line 8.

It will be seen from Fig. 1 that the so-called "still" type of fishing can, with the help of my float, be effectively carried on over a much larger area relative to the fisherman's position than heretofore.

My fishing float comprises a buoyant body 10 that may be of any suitable material and shape. A pair of hermetically sealed metallic hemispheres are particularly satisfactory for the body 10.

Suitably attached to the buoyant body 10 is a supporting means such as a U-shaped member 11. The free ends of the parallel arms of the member 11 may be bent outwardly and affixed to the body 10 as shown at 12 and 13 in Fig. 3.

Figure 3:
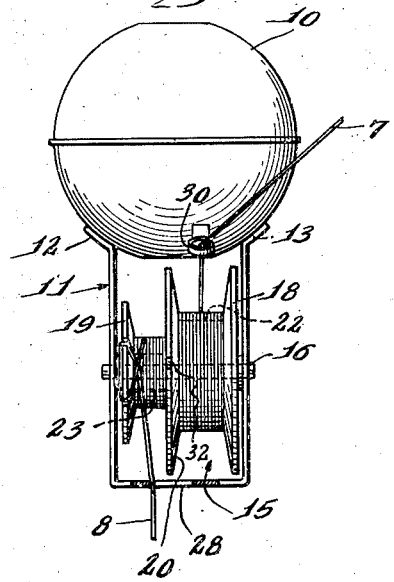
Fig. 3 is a view in front elevation.

A reel, generally indicated by 15, is mounted for free rotation between the arms of the U-shaped member 11. As best shown in Fig. 3, reel 15 may have a shaft 16 that extends through aligned holes in the respective arms.

Reel 15 has end flanges 18 and 19, and an intermediate flange 20 (Fig. 3). A drum 22 of one radius is disposed between flanges 18 and 20, and a drum 23 of a smaller radius is similarly disposed between flanges 19 and 20.

End flange 19 has a pair of spaced holes 25 for anchoring the end of the line 8 used on drum 23, while end flange 18 has a similar pair of spaced holes 26 for anchoring the end of the line 7 wound on drum 22. End flange 19 also has a pair of spaced peripheral notches 27 that accept a loop 29 (a half hitch) in line 8 so as to limit the length of line that is fed out by the reel during operation of the device. Thus a setting of line 8 for any predetermined fishing depth is achieved without tying a knot in the line.

Line 8 of drum 23 has one end tied through holes 25 in flange 19. This line, after passing a number of times around drum 23, extends through an elongated slot 28 (Figs. 3 and 4) in the web portion of U-shaped member 11. The slot 28 acts as a guide. Suitable sinkers, hooks and bait 9 (Fig. 1) are attached to the other end of line 8. As mentioned above, half hitch 29 is made in line 8 a predetermined distance from its hook end, and two portions of the loop are inserted in the notches 27 to stop reel operation after the desired length of line 8 has been fed out by the reel.

Figure 2:
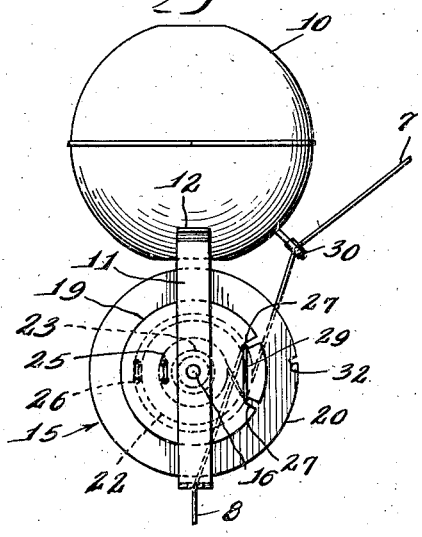
Fig. 2 is a view in side elevation of my float.

Referring to Figs. 2 and 3, the line 7 extending from the fisherman passes through a guide 30 carried by the buoyant body 10. Line 7 has its end tied through holes 26 in intermediate flange 20, this attachment of line 7 to the flange being made when line 8 is almost totally wound upon its drum 23. It will be noted that guide 30 through which line 7 passes is carried by body 10 in close proximity to the drum 22 upon which a portion of line 7 is wound during operation of the device.

Figure 4:
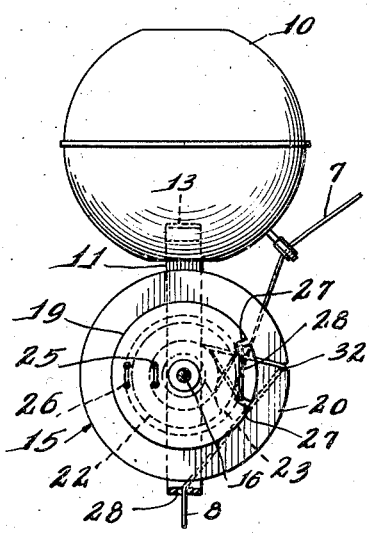
Fig. 4 is a view in side elevation, partly in section, showing certain features of the invention.

In order to insure proper operation of the float, intermediate flange 20 is provided with a peripheral notch 32 (Figs. 2 and 4). The line 8 is made to engage notch 32 near its free end, as shown in Fig. 4, when the major portion of line 8 is wound on drum 23 preparatory to casting the float to a fishing position. By passing line 8 through notch 32 and permitting a turn or two of the line to be wound on drum 22, it will be seen that rotation of reel 15 due to the weight at the end of line 8 will not be impeded by reason of possible "wedging" or locking of line 8 on drum 23. The weight at the end of line 8 will cause reel rotation to unwind the loose turn or two from drum 22, and then the line, in freeing itself from notch 32, will produce a jerk action that will insure continued unwinding from drum 23.

As line 8 unwinds from drum 23, line 7 is, to a corresponding extent, wound on drum 22. Thus the fisherman must provide enough slack line for this purpose.

From the above description it is thought that the construction and advantages of this invention will be readily apparent to those skilled in the art. Various changes and modifications may be made without departing from the spirit or losing the advantages of the invention.

Having thus described the invention, what I claim as new and desire to secure by Letters Patent is:

A fishing float comprising a buoyant body, a U-shaped member having its free ends attached to said body, a reel mounted for free rotation between the arms of said member, said reel having end flanges, an intermediate flange and drums of different radii between adjacent flanges, and a line guide carried by said body in close proximity to the drum of larger radius, said intermediate flange having a peripheral notch therein and the web portion of said U-shaped member having an elongated central slot therein.

EDWARD B. SCHIFFMANN.

REFERENCES CITED

The following references are of record in the file of this patent:

UNITED STATES PATENTS

| Number | Name | Date |
|---|---|---|
| 541,789 | Kunzelman | June 25, 1895 |